United States Patent
Ares

[11] 3,720,941
[45] March 13, 1973

[54] AUTOMATIC MONOPULSE CLUTTER CANCELLATION CIRCUIT

[75] Inventor: Manuel Ares, Manlius, N.Y.

[73] Assignee: General Electric Company, Syracuse, N.Y.

[22] Filed: April 13, 1970

[21] Appl. No.: 27,919

[52] U.S. Cl..............343/7 A, 343/16 M, 343/7.1 R
[51] Int. Cl..............................................G01s 9/02
[58] Field of Search.............343/7 A, 16 M, 17.1 R

[56] References Cited

UNITED STATES PATENTS

| | | | |
|---|---|---|---|
| 3,128,461 | 4/1964 | Case | 343/16 M |
| 3,189,900 | 6/1965 | Raabe | 343/16 R |
| 3,353,180 | 11/1967 | Anderson | 343/16 M |
| 3,390,390 | 6/1968 | Vehrs | 343/16 M |
| 3,392,387 | 7/1968 | Kirkpatrick | 343/16 M |

Primary Examiner—T. H. Tubbesing
Attorney—Carl W. Baker, Frank L. Neuhauser, Oscar B. Waddell and Joseph B. Forman

[57] ABSTRACT

Clutter cancellation is provided in a monopulse radar system by placing a null in the angle response of the radar on the clutter. This is achieved by cross-cancellation of signals as received at two antennas oriented to provide vertically displaced response patterns, the null thus provided being maintained centered on the clutter by operation of control means which adjust the phase and amplitude of one or both of the signals prior to their cross-cancellation. The signal phase and amplitude adjustment means may take any of several different forms but in each case they form part of closed loop controls which optimize the cancellation of clutter returns from received signals while preserving target returns.

8 Claims, 6 Drawing Figures $\Sigma = A+B$
$\Delta = A-B$ $\Sigma + \Delta = 2A$
$\Sigma - \Delta = 2B$

INVENTOR:
MANUEL ARES,

BY   C.W. Baker
HIS ATTORNEY.

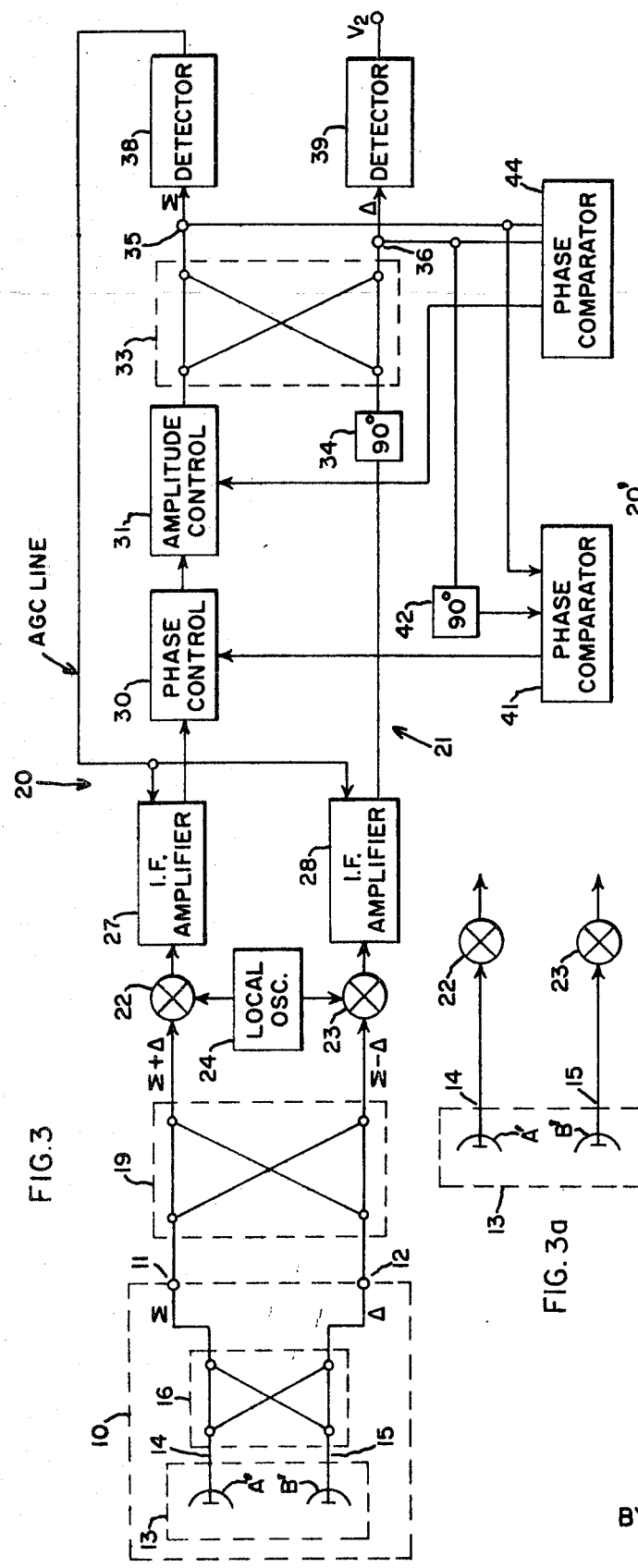

3,720,941

AUTOMATIC MONOPULSE CLUTTER CANCELLATION CIRCUIT

BACKGROUND OF THE INVENTION

This invention relates generally to monopulse radar systems, and more specifically to clutter cancellation in monopulse radar systems.

Monopulse techniques have found wide application in radar systems because their use enables measurement of of the position of a target with a single echo pulse, and since measurement of range also may be performed with the same pulse, target position in three coordinates can be determined completely with but a single pulse. To accomplish this two antennas are provided for each plane, azimuth or elevation, in which target position is to be determined, and the two antennas are slightly displaced or angled apart in that plane so each will have a reception lobe displaced slightly to one side or the other of the beam axis. A target located exactly on the beam axis then will cause each antenna to output the same target return signal, but a target located off to either side of the beam axis will cause the antenna on that side to output a signal differing from the other in amplitude and phase. The difference between the output signals from the two antennas thus is indicative of the angular displacement between the target and the beam axis. The sum of the two output signals is indicative of the gross signal received, and is used as a normalizing factor.

In monopulse as well as other radar systems echo pulses are received not only from the target but also from the ground and objects located on the ground. These terrain reflections are referred to as ground return or, more commonly, clutter, and their amplitude generally is significantly greater than that of the target return because of the much larger reflective surface area which contributes to the ground return. Therefore, clutter tends to mask target returns making them very difficult to detect, and many different techniques have been suggested for enabling detection and derivation of target information in the presence of clutter.

One such technique for enabling visibility of targets in clutter is the well-known MTI, or moving target indicator, which employs pulse Doppler techniques. In this approach, the phase difference between the target and the clutter signals varies as the target moves relatively to the ground so that target information is obtained due to target movement. This approach is disadvantageous in that there are "blind speeds" at which no response is produced even to a moving target. Due to a stroboscopic effect, there is no phase difference between the target and clutter signals. In addition, the MTI system is incapable of detecting a target hovering over the ground since it is not moving with respect to the ground.

Monopulse techniques have also been employed to yield target information in the presence of clutter. Certain of the more successful of these techniques involve the processing of elevated target echoes preferentially with respect to ground clutter echoes, this being accomplished through a subtraction or cross cancellation of signals as received by two antennas displaced in the vertical plane. Clutter returns will generally be of near equal amplitudes at the two antennas and can be made to cancel each other; returns from any targets not squarely on boresight will not be identical at the two antennas and so will not cancel. Thus ground clutter echoes may be suppressed and target echoes preserved, by continuously directing the reflection null of the monopulse radar elevation beam at the ground clutter and sensing for echoes received at elevation angles higher than the elevation angle at which the elevation beam reflection null is directed.

The present invention is directed to radar systems utilizing monopulse techniques of this general kind for clutter cancellation, but affording significantly improved cancellation performance. In each of its several alternative embodiments disclosed the invention provides an adaptive or closed loop control optimizing the cancellation of clutter even under adverse operating conditions, and does so without accompanying complexity of circuitry or operation.

SUMMARY OF THE INVENTION

It is therefore a general object of the present invention to provide a reliable monopulse radar system which is simplified in construction and which substantially completely cancels clutter.

It is a more specific object of the present invention to provide a monopulse radar system in which the relative phases and amplitudes of incoming signals are adjusted automatically as necessary to optimize target visibility in clutter.

Briefly stated, in accordance with the present invention there is provided a monopulse radar system in which the relative phase and amplitude of incoming pulses in first and second channels are automatically adjusted as necessary to substantially completely cancel the clutter. More specifically, the input signals to the first and second channels are provided to a closed loop circuit in which the relative phase and amplitude of the signals in the two channels are compared. In one form of the present invention, the closed loop circuit includes a signal combining means which provides sum and difference signals which are each supplied to phase control and an amplitude control in one channel. In another form of the invention, the closed loop circuit comprises a canceller in which the signals are combined to provide a difference signal output from which clutter is nulled.

BRIEF DESCRIPTION OF THE DRAWINGS

The circuitry with which the foregoing objects are achieved and the features of novelty characterizing the present invention are pointed out with particularity in the claims forming the concluding portion of the specification. For a better understanding of the present invention, reference should be had to the following description taken in connection with the accompanying drawings, in which:

FIG. 3 is a representation in block diagrammatic form of a first embodiment of the present invention; and FIG. 3a is a partial block diagrammatic representation of another form of the circuit of FIG. 3; and FIG. 4 is a block diagrammatic representation of another embodiment of the present invention.

DESCRIPTION OF THE PREFERRED EMBODIMENTS

Figure 1:
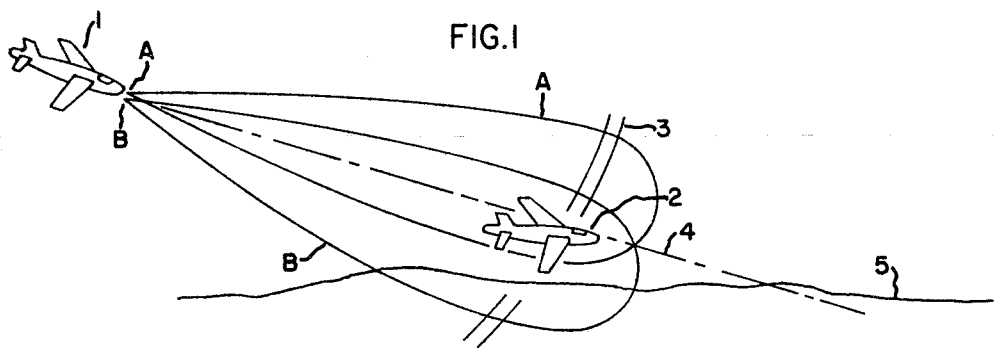
FIG. 1 is an illustration of the use of the present invention.

Referring now to FIG. 1, there is illustrated a representative situation in which monopulse radar is employed. A monopulse radar system is included in an aircraft 1 and produces radiation and reception lobes A and B. Two antennas A' and B' which produce the radiation lobes A and B are placed in a vertical plane to measure the elevation of a target 2 in terms of angular position of a beam axis 4. This target 2 may be, for example, an aircraft. When the target 2 lies within the reception lobes A and B, as shown in FIG. 1, there is a target response in each antenna A' and B'. A single pulse is radiated from the antennas, and reaches the target at a time $t$. An echo pulse is reflected back from the target 2 and received by the radar. The area which is covered by the radiated pulse during time $t$ is termed a range cell, and is indicated by the reference numeral 3. Response received within the range cell 3 also includes ground return, or clutter from ground 5. The direction of the clutter is different from that of the echo from the target 2, due to the elevation of the target 2 above ground.

Figure 2A:
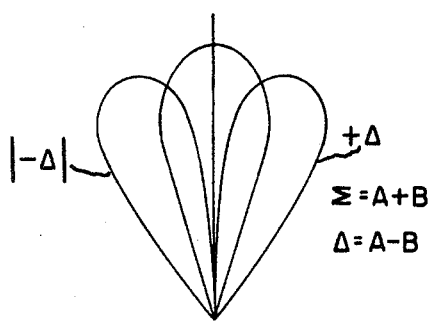
FIG. 2a is a representation in polar coordinate form of sum and difference response patterns of two coplanar antennas.

Referring now to FIG. 2a, there are illustrated in polar coordinate form the characteristic monopulse antenna response patterns. The center lobe is labeled $\Sigma$, and is equal to the algebraic sum of the response patterns of the antennas A' and B'. Also illustrated are lobes representative of $\Delta$ and the absolute value of $-\Delta$. The $\Delta$ lobe is representative of the algebraic difference of the A and B response patterns. The difference between the A and B responses to target 2 is indicative of the angular displacement of that target from the beam axis 4 of the monopulse radar included in the aircraft 1. However, unless the beam axis is centered in the clutter a difference signal much larger in magnitude than the target signal will be produced in response to the clutter, the larger amplitude of this signal being due to the greater reflective area of the ground. In accordance with the present invention this larger amplitude signal is given control of the beam axis and is caused to steer it to the clutter, thus nulling the difference signal response thereto. Since the target 2 is at a different angle with respect to the beam axis 4 from that of the ground 5, the signal indicative of the presence of the target 2 is not zero when the clutter response is nulled.

Figure 2B:
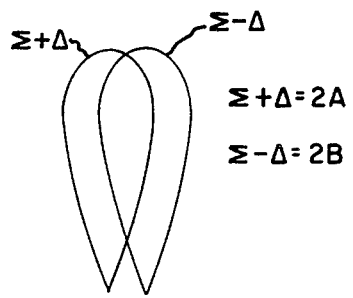
FIG. 2b is a representation of response patterns of the individual coplanar antennas and is also representative of sum plus difference and sum minus difference responses of the antenna system.

Rather than processing signals indicative of the response patterns of FIG. 2a, the present invention may if preferred utilize signals indicative of the response patterns shown in FIG. 2b, which are referred to as the sum plus difference signal, $\Sigma + \Delta$, and the sum minus difference signal, $\Sigma - \Delta$. As explained above:

$$\Sigma = A + B, \qquad (1)$$

$$\Delta = A - B. \qquad (2)$$

By addition and subtraction the following results may be observed:

$$\Sigma + \Delta = 2A, \qquad (3)$$

$$\Sigma - \Delta = 2B. \qquad (4)$$

Thus the response patterns illustrated in FIG. 2b are directly indicative of the reception lobes A and B rather than the sums and differences as shown in FIG. 2a.

Referring now to FIG. 3 there is illustrated a monopulse clutter cancellation circuit in which input signals are derived from a monopulse antenna unit 10 providing $\Sigma$ and $\Delta$ signals at terminals 11 and 12 respectively. The antenna unit 10 includes a monopulse antenna 13 which comprises the antennas A' and B' discussed with respect to FIG. 1 and provides A and B output signals indicative of the response in the A and B reception lobes at terminals 14 and 15 respectively. A "magic tee" 16 is coupled to the terminals 14 and 15 to combine the signals and provide $\Sigma$ and $\Delta$ signals at the terminals 11 and 12. An antenna unit 10 providing $\Sigma$ and $\Delta$ output signals is illustrated since this form of antenna and magic tee combiner commonly are included in monopulse radar systems. If appropriate coupling is provided, terminals 14 and 15 could if preferred be directly coupled to the monopulse clutter cancellation circuit of the present invention, as shown in FIG. 3a.

The monopulse clutter cancellation circuit comprises a magic tee 19 having first and second terminals connected to terminals 11 and 12 respectively at the antenna unit 10. Magic tee 19 combines the $\Sigma$ and $\Delta$ signals and is connected to derive a $\Sigma + \Delta$ signal which is coupled to a mixer 22 in a first channel 20 and to derive a $\Sigma - \Delta$ signal which is coupled to a mixer 23 in a second channel 21. A local oscillator 24 is also connected to the mixers 22 and 23. The $\Sigma + \Delta$ and the $\Sigma - \Delta$ channel signals are heterodyned to a convenient intermediate frequency, to which are tuned the intermediate frequency stages 27 and 28 connected to the outputs of mixers 22 and 23, respectively. The $\Sigma + \Delta$ channel further includes a phase shifting means comprising a phase control 30 and an amplitude adjusting means comprising an amplitude control 31, serially coupled between the output of IF stage 27 and an upper input of an IF hybrid network 33. The output of IF stage 28 is coupled to a lower input of the hybrid 33.

The signals in the two channels 20 and 21 are recombined in IF hybrid 33 which includes a 90° phase shift network 34 connected in series with its lower input, this being for the purpose of compensating the 90° phase shift within the hybrid. Output signals from the hybrid are at IF and include a $\Sigma$ signal at terminal 35 and a $\Delta$ signal at terminal 36. Terminal 35 is connected to a detector 38 to provide a sum output signal and the terminal 36 is connected to a detector 39 to provide a difference output signal.

In order to provide closed loop control of the relative phases of the signals in the channels 20 and 21, the $\Sigma$ and $\Delta$ terminals 35 and 36 are also coupled to a first phase comparator 41, the output signal being shifted 90° in phase by a phase shifter 42 connected between terminal 36 and comparator 41. The $\Delta$ output of comparator 41 is coupled to the phase control 30. Terminals 35 and 36 also are connected to a second phase comparator 44 which provides an output to amplitude control 31 for closed loop control of the relative amplitudes of the signals in the channels 20 and 21. In addition, the output of the $\Sigma$ signal detector 38, which provides a normalized output $V_1$ indicative of the sum of the received signals, provides an AGC signal to the IF stages 27 and 28 to control their gain and prevent saturation. The output of the $\Delta$ signal detector 39 provides a signal $V_2$ indicative of the presence or absence of a target within the antenna lobes A and B.

The operation of the circuit is as follows. It is assumed that antenna 13 is pointing at a target lying within the lobes A and B and also at the ground 5, so that the clutter response is much greater in amplitude than the target return. Incoming $\Sigma$ and $\Delta$ signals from the ports 11 and 12 are combined by magic tee 19 to provide a $\Sigma + \Delta$ signal to channel 20 and a $\Sigma - \Delta$ signal to channel 21. The signals are mixed and supplied to IF stages 27 and 28. The $\Sigma + \Delta$ and $\Sigma - \Delta$ signals are coupled to first and second terminals of IF hybrid 33 which combines the inputs to its upper and lower terminals in well-known manner to produce an output of C + D at its lower port, where C and D are the inputs to its upper and lower input terminals respectively. The 90° phase shifter 34 is connected in the channel 21 at the lower input of the hybrid network 33 so that it provides an output of C + D at the terminal 35 and an output of C − D at the terminal 36. By substituting $\Sigma + \Delta$ for the term C in the previous expressions and substituting $\Sigma - \Delta$ for the term D, it is readily apparent that the outputs at terminals 35 and 36 respectively are indicative of $\Sigma$ and $\Delta$.

The $\Sigma$ and $\Delta$ signals are supplied to phase comparators 41 and 44 to electronically steer the clutter cancellation circuit as a function of time by controlling the phase and amplitude of the signal in one channel to produce a null at the $\Delta$ terminal 36. Phase comparators 41 and 44 are well-known circuits which operate to produce an output signal having a polarity and amplitude responsive to the component of the $\Delta$ signal which is in phase with the $\Sigma$ signal. Maximum positive amplitude output is obtained when the signals are in phase with each other, and maximum negative output is obtained when the signals are 180° out of phase with each other. When the $\Sigma$ and $\Delta$ signals are in quadrature with each other, with either 90° or 270° phase difference, there is zero output.

When the $\Sigma$ and $\Delta$ signals are in phase, the inputs to the phase sensitive detector 41 then are in quadrature by reason of the presence of the 90° phase shifter 42 in one input. Thus when the $\Sigma$ and $\Delta$ signals are precisely in phase there will be no signal outputted from phase comparator 41 to the phase control circuit 30 to change the relative phases of the $\Sigma$ and $\Delta$ signals. However, if the phase of a $\Sigma$ signal leads that of the $\Delta$ signal, phase comparator 41 will produce an output of first polarity until this phase error is nulled by the phase control 30; if the phase of the $\Sigma$ signal lags that of the $\Delta$ signal, phase comparator 41 will produce a signal of second polarity until the phase error is nulled. Since the $\Sigma$ and $\Delta$ signals thus are maintained precisely in phase, any difference between them must be due to a difference in amplitude. Therefore, phase comparator 44 will produce a maximum output to the amplitude control 31 when the $\Sigma$ and $\Delta$ signals are in phase to adjust the amplitude of the signal in the $\Sigma + \Delta$ channel to produce a null at the $\Delta$ terminal 36.

Phase control 30 and amplitude control 31 thus regulate the phase and amplitude of the signal in channel 20 to make it equal in phase and amplitude to the signal in channel 21.

The time constants of the phase comparators 41 and 44 are adjusted so that only clutter within the range cell being considered (in this case, the range cell 3 of FIG. 1) is effective in controlling the phase and amplitude closed loops. The time constants of comparators 41 and 44 are made short so that only range cells near the one being examined contribute to the error signal. In this manner the angle at which the null occurs varies to compensate for variations in the elevation of the ground. Since the targets of interest are at a different elevation from that of the ground, the response to the target 2 will not be zero when the clutter is nulled. Thus, even in the presence of clutter, the output $V_2$ of the amplitude detector 39 will indicate the presence of a target.

Another arrangement for cancelling clutter is illustrated in FIG. 4 in which the same reference numerals are utilized to denote elements corresponding to those of FIG. 3. In the circuit of FIG. 4, the outputs of the mixers 22 and 23 in channels 20' and 21' are coupled to a canceller circuit 50 to provide at terminal 51 an output from which clutter is cancelled. The canceller circuit shown is similar in basic arrangement to the side-lobe canceller disclosed in U.S. Pat. No. 3,202,990, which issued Aug. 24, 1965 to Paul W. Howells and is assigned to the assignee of the present application.

In the circuit of FIG. 4, the output of the $\Sigma + \Delta$ mixer 22 is coupled to a mixer 55, and also to a band pass filter 57 which provides an output to another mixer 58. The output of mixer 58 is coupled to a narrow band filter 59 which provides a second input to mixer 55. The output of mixer 55 is coupled to a subtracting circuit 61 which has a second input connected to the output of mixer 23. Subtracting circuit 61 provides an output to a band pass filter 63 having an output coupled to output terminal 51 and also to a second input of mixer 58. The side-lobe canceller 50, as more fully explained in the aforementioned Howells patent, operates to equalize the phase and amplitude of the $\Sigma + \Delta$ and the $\Sigma - \Delta$ signals in channels 20' and 21'.

The $\Sigma + \Delta$ and $\Sigma - \Delta$ signals are coupled by band pass filters 57 and 63 respectively to mixer 58. The two signals are mixed by mixer 58 and filtered by narrow band filter 59 to supply a second signal to mixer 55. This second signal is proportional in amplitude to the average power of the $\Sigma + \Delta$ signal, and has a phase relationship with respect to the $\Sigma + \Delta$ signal such that when mixed therewith at 55 the resultant is a phase equalized signal to the subtracting circuit 61 having an amplitude proportional to the level of the clutter in the $\Sigma - \Delta$ signal. Upon subtracting this amplitude and phase equalized signal from the $\Sigma - \Delta$ signal at 61 only target signal remains.

Thus the signal path to the channel 21' through the subtraction circuit 61 completes a nonlinear closed loop providing automatic gain and phase adjustments so that the clutter signal approaches zero in the output from channel 21'. The speed of the response of the system is dependent upon the loop gain and upon the bandwidth of the narrow band filter 59. Since loop gain is proportional to average power, the loop cancels clutter signals, which have high average power, and it is relatively insensitive to target echo returns, which have low average power. Thus the output appearing at the terminal 51 is indicative of the presence of a target while clutter is cancelled.

Other variations of the circuitry disclosed are possible, as for example the amplitude control of FIG. 3 could be replaced by a hybrid and a phase control, thereby permitting use of phase shifting mixers for both amplitude and phase control. In these and other possible implementations the monopulse clutter cancellation circuit of the present invention affords signal-to-clutter ratio improvement independent of target velocity, and also provides automatic compensation for variations in terrain height and adaptability to use in conjunction with other clutter rejection techniques such as MTI.

What is claimed as new and desired to be secured by Letters Patent of the United States is:

1. In a monopulse radar system, a clutter cancellation circuit comprising in combination:
   a. means for deriving first and second signals respectively indicative of first and second reception lobe responses of a monopulse antenna;
   b. first and second channels respectively coupled to said first and second signals;
   c. signal combining means for algebraically combining the signals in said first and second channels, for providing a difference signal indicative of the algebraic difference of the signals in the said first and second channels, whereby a clutter cancelled output is provided when the phase and amplitude differences between the signals in said first and second channels are nulled;
   d. phase shifting means connected in series in said first channel for nulling the phase difference of the signals in said first and second channels; and
   e. amplitude adjusting means connected in said first channel for nulling the amplitude difference between the signals in said first and second channels.

2. In a monopulse radar system according to claim 1 and including a monopulse antenna having first and second ports in which said means for deriving said first and second signals comprises direct coupling means for coupling said first and second channels respectively to first and second ports of the monopulse antenna.

3. A monopulse radar system according to claim 1 and including a monopulse antenna unit having first and second ports respectively providing signals indicative of the sum and of the difference of first and second lobe responses of a monopulse antenna in which said means for deriving said first and second signals comprises a magic tee having first and second input terminals for respective coupling to the first and second ports of the monopulse antenna unit and third and fourth terminals respectively coupled to said first and second channels.

4. A clutter cancellation circuit according to claim 1 in which said signal combining means comprises a hybrid circuit having first and second terminals connected to receive signals from said first and second channels respectively, and third and fourth terminals, said third terminal providing a sum signal indicative of the algebraic sum of the signals in said first and second channels, and said fourth terminal providing the difference signal.

5. A clutter cancellation circuit according to claim 4 in which said phase shifting means comprises a variable phase shifter and further comprising a phase sensitive detector having a first input terminal connected to receive the difference signal from said hybrid circuit shifted by 90°, and a second input terminal connected to receive the sum signal from said hybrid circuit and an output terminal connected to regulate the magnitude of phase shift produced by said variable phase shifter, whereby a closed loop is formed to null the phase error between the signals in said first and second channels.

6. A monopulse clutter cancellation circuit according to claim 5 further comprising a second phase sensitive detector having first and second inputs connected to receive said sum and difference signals respectively from said hybrid circuit and an output terminal connected to regulate the level of output of said amplitude control, whereby a closed loop is formed to null the error between the amplitudes of the signals in said first and second channels.

7. A monopulse clutter cancellation circuit according to claim 6 in which said first and second channels include intermediate frequency stages and further comprising first and second amplitude detectors coupled respectively to the sum and difference signal outputs of said hybrid circuit and means coupling the output of said first amplitude detector to said intermediate frequency stages to control their gain.

8. A clutter cancellation circuit according to claim 1 in which said signal combining means, said phase shifting and said amplitude adjusting means are constituted by a closed loop canceller comprising a subtraction circuit connected in one of said channels, and cancellation signal generating means connected to derive from the signals in both said channels a cancellation signal which is amplitude and phase equalized to the clutter signal in said one channel, said cancellation signal being applied to said subtraction circuit in said one channel so as to null the clutter signal therein.

* * * * *